US012758058B2

(12) United States Patent
Lee et al.

(10) Patent No.: US 12,758,058 B2
(45) Date of Patent: Oct. 13, 2026

(54) GRINDING CONTAINER

(71) Applicant: SAMHWA CO., LTD, Uiwang-si (KR)

(72) Inventors: Kyungchang Lee, Uiwang-si (KR); Kwan Ho Lee, Suwon-si (KR)

(73) Assignee: SAMHWA CO., LTD, Uiwang-si (KR)

( * ) Notice: Subject to any disclaimer, the term of this patent is extended or adjusted under 35 U.S.C. 154(b) by 207 days.

(21) Appl. No.: 18/903,369

(22) Filed: Oct. 1, 2024

(65) Prior Publication Data

US 2025/0169655 A1 May 29, 2025

(30) Foreign Application Priority Data

Nov. 23, 2023 (KR) ........................ 10-2023-0163972

(51) Int. Cl.

| | |
|---|---|
| ***A47K 5/09*** | (2006.01) |
| ***A45D 33/00*** | (2006.01) |
| ***A45D 33/02*** | (2006.01) |
| ***A45D 33/26*** | (2006.01) |
| ***B02C 19/00*** | (2006.01) |
| ***B65D 51/24*** | (2006.01) |

(52) U.S. Cl.

CPC ................ *A47K 5/09* (2013.01); *A45D 33/00* (2013.01); *A45D 33/025* (2013.01); *A45D 33/26* (2013.01); *B02C 19/00* (2013.01); *B65D 51/246* (2013.01); *A45D 2033/001* (2013.01)

(58) Field of Classification Search

CPC ........ A47K 5/09; B65D 51/246; A45D 33/00; A45D 2033/001; A45D 33/26; A45D 33/025; B02C 19/00

See application file for complete search history.

(56) References Cited

U.S. PATENT DOCUMENTS

| | | | | |
|---|---|---|---|---|
| 11,832,703 | B2 * | 12/2023 | Lee | A45D 33/04 |
| 2021/0059383 | A1 * | 3/2021 | Cho | A45D 33/006 |
| 2021/0378382 | A1 * | 12/2021 | Lee | A45D 33/04 |
| 2022/0095767 | A1 * | 3/2022 | Lee | A45D 33/04 |
| 2024/0398093 | A1 * | 12/2024 | Lee | A45D 33/26 |
| 2024/0407533 | A1 * | 12/2024 | Lee | A45D 33/14 |

* cited by examiner

*Primary Examiner* — Frederick C Nicolas

(74) *Attorney, Agent, or Firm* — Bridgeway IP Law Group, PLLC; Jihun Kim

(57) ABSTRACT

A grinding container that can provide a solidified product in a ground form is described. The grinding container includes: a container body that includes a main shell and a socket cylinder, where the main shell may form a mounting space having an open top on its inner side, and the socket cylinder may form a manipulation channel on its inner side that provides communication between the mounting space and the exterior; a piston that has a guide slit formed in its upper surface and is configured to move along a vertical direction in relation to the container body; a dial that is rotatably coupled to the container body and includes a guide pillar extending up to the mounting space through the manipulation channel; and a cutter plate that includes a cutter blade formed on its bottom surface for grinding the solidified content.

11 Claims, 14 Drawing Sheets

GRINDING CONTAINER

CROSS-REFERENCE TO RELATED APPLICATIONS

This application claims the benefit of Korean Patent Application No. 10-2023-0163972, filed with the Korean Intellectual Property Office on Nov. 23, 2023, the disclosure of which is incorporated herein by reference in its entirety.

BACKGROUND

1. Technical Field

The present invention relates to a container for holding a solidified product, more particularly to a grinding container that can provide the solidified product in a ground form.

2. Description of the Related Art

Certain functional compositions are manufactured and distributed in solidified forms of specified volumes. Compared to liquid products, a composition provided as a solid provides the advantage of being less likely to spill or leak from the container but, on the other hand, carries the disadvantage of being more difficult to apply to a target area. In recent times, the grinding container was developed, which includes a cutter blade in the container itself. The grinding container makes it easier to use a solidified product by first grinding the solidified product and then dispensing the ground powder.

In a grinding container, there is frequent relative movement between components, as certain components remain fixed, while other components are rotated. Also, some components must push the solidified product upward in accordance with the manipulation applied by the user. In such structures, the components must be kept properly aligned in their correct positions if the product is to be used properly. However, if the parts that support the moving components are made too rigid, there is a risk that the resulting stresses may be concentrated at certain points, causing abrasion and damage at the corresponding parts, but if the parts that support the moving components are made too flexible, there is a risk that the supported content cannot maintain a properly aligned state, so that the grinding action may not be performed properly.

SUMMARY OF THE INVENTION

An aspect of the present invention, which was conceived to resolve the problem described above, is to provide a grinding container in which the parts supporting the moving components have an appropriate degree of flexibility and in which the content can maintain an aligned state in a stable manner.

Another aspect of the invention is to provide a grinding container that can be used conveniently by the user.

Other objectives of the present invention will be more clearly understood from the embodiments set forth below.

A grinding container according to one aspect of the invention may include: a container body that includes a main shell and a socket cylinder, where the main shell may form a mounting space having an open top on its inner side, the socket cylinder may be positioned at a lower portion on an inner side of the main shell and may extend a particular length along a vertical direction, and the socket cylinder may form a manipulation channel on its inner side that provides communication between the mounting space and the exterior; a piston, at least a portion of which is arranged within the mounting space to support a solidified content, where the piston may have a guide slit formed in its upper surface and is configured to move along a vertical direction in relation to the container body, and the guide slit may penetrate the upper surface of the piston along a vertical direction; a dial that is rotatably coupled to a lower portion of the container body and includes a guide pillar extending up to the mounting space, where the guide pillar may be inserted in the guide slit through the manipulation channel such that an upper end of the guide pillar is positioned within the mounting space; and a cutter plate that is coupled to an upper portion of the container body to cover the top of the mounting space, where the cutter plate includes a cutter blade formed on its bottom surface for grinding the solidified content, and a discharge hole that penetrates the cutter plate along a vertical direction may be formed in the cutter plate for discharging the ground solidified content.

A grinding container according to an embodiment of the present invention can include one or more of the following features. For example, the piston can include a stem that extends down such that at least a portion of the stem is positioned within the manipulation channel, a thread can be provided on either one of the inner perimeter of the socket cylinder and the outer perimeter of the stem, and a mating protrusion configured to mate with the thread can be formed on the other of the inner perimeter of the socket cylinder and the outer perimeter of the stem.

The dial can include a first insert coupling part extending upward, and the piston can include a second insert coupling part extending downward. Either one of the first insert coupling part and the second insert coupling part can include a sleeve that forms an insertion space on its inner side, and the other of the first insert coupling part and the second insert coupling part can include a support pillar that is inserted into the insertion space of the sleeve. Here, the support sleeve can have a non-circular cross section so as to prevent the piston from rotating in relation to the dial but permit the piston to move along a vertical direction in relation to the dial.

In cases where the first insert coupling part includes the sleeve and the second insert coupling part includes the support pillar, a portion of the guide pillar can be positioned on an inner side of the sleeve, and a guide groove in which the guide pillar may be inserted can be formed in the side surface of the support pillar.

The dial can include a multiple number of guide pillars and can also include a reinforcing wall that extends up from a lower surface of the dial and connects the lower portion of each of the multiple guide pillars.

A lower portion of the socket cylinder can extend below the main shell, and the dial can include a coupling rim that is rotatably coupled to the lower portion of the socket cylinder. A clearance slit can be formed in the dial on the inner side of the coupling rim.

The cutter blade can extend in an elongated form from an edge of the cutter plate inward along a first direction up to a position beyond the center of the cutter plate with respect to the first direction The cutter blade can extend along an imaginary line on the cutter plate, where the imaginary line does not pass through the center of the cutter plate.

The grinding container can further include an overcap that can be detachably coupled to at least one of the container body and the cutter plate. The overcap can be provided with a detachably coupled spatula.

An embodiment of the present invention having the features above can provide various advantageous effects including the following. However, an embodiment of the present invention may not necessarily exhibit all of the effects below.

An embodiment of the present invention provides a grinding container that can be used conveniently by the user and can keep the content aligned in a stable manner while providing an appropriate degree of flexibility for the parts supporting the moving components.

DETAILED DESCRIPTION OF THE INVENTION

Figure 1:
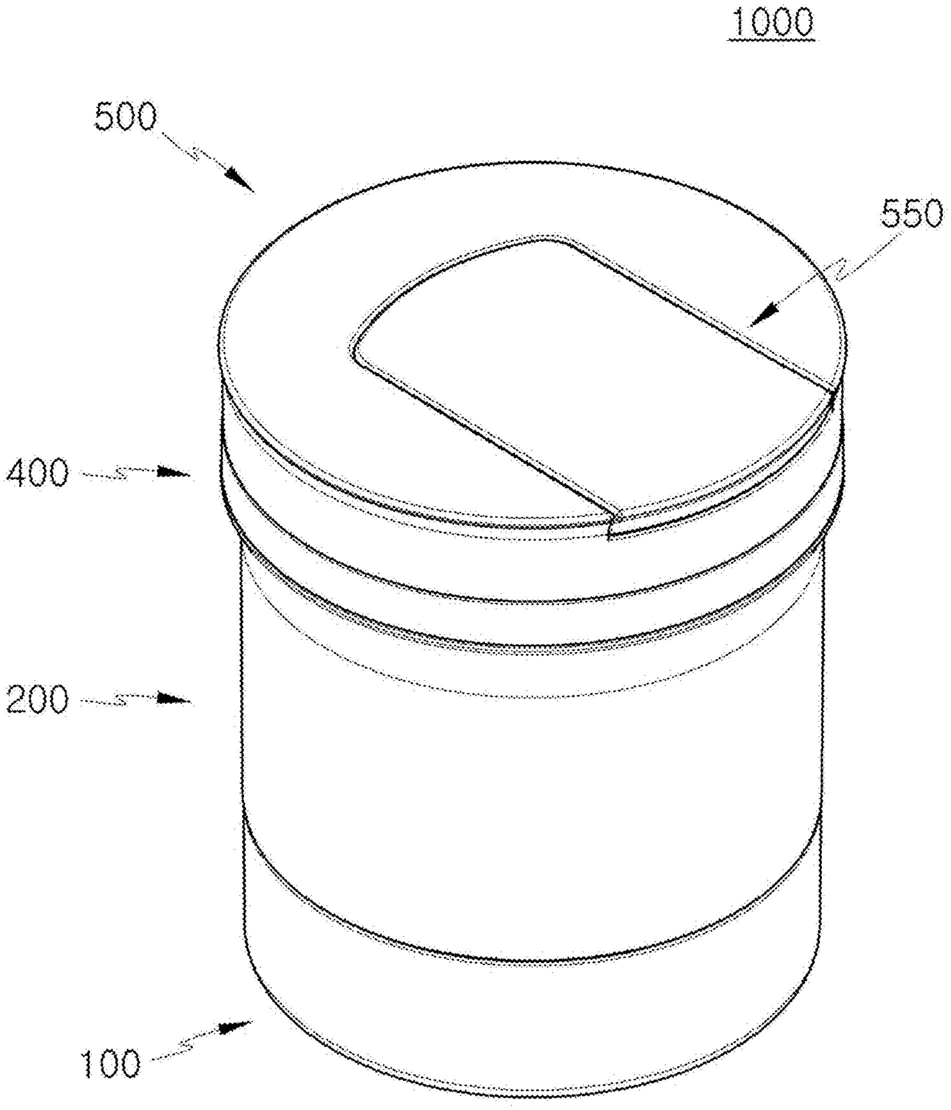
FIG. 1 is a perspective view illustrating a grinding container according to an embodiment of the invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed by the present invention. In the description of the present invention, certain detailed explanations of the related art are omitted if it is deemed that they may unnecessarily obscure the essence of the invention.

The terms used in the present specification are merely used to describe particular embodiments and are not intended to limit the present invention. An expression used in the singular encompasses the expression of the plural, unless it has a clearly different meaning in the context. In the present specification, it is to be understood that terms such as "including" or "having," etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

While such terms as "first" and "second," etc., can be used to describe various components, such components are not to be limited by the above terms. The above terms are used only to distinguish one component from another.

Certain embodiments of the present invention will be described below in more detail with reference to the accompanying drawings. Those components that are the same or are in correspondence are rendered the same reference numeral, and redundant descriptions are omitted.

Figure 2:
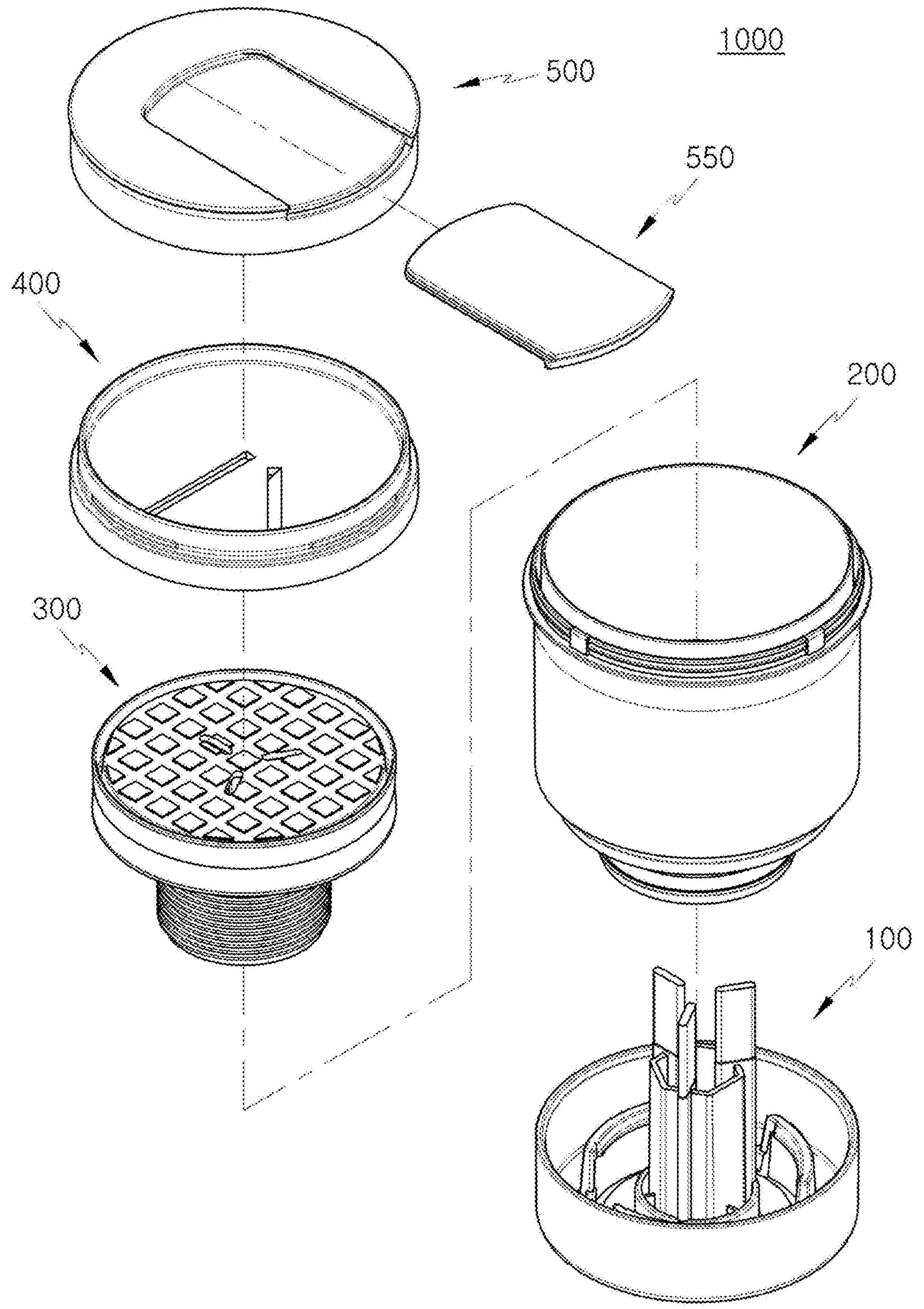
FIG. 2 is an exploded perspective view illustrating the grinding container shown in FIG. 1.

For convenience, the specification uses terms such as "inner", "outer", "upper", and "lower". In the descriptions below, an "inner" side refers to a side closer to the interior of the grinding container 1000, whereas an "outer" side refers to a side further away from the interior of the grinding container 1000. The terms "upper" and "lower" are used to describe the elevating grinding container 1000 when it is oriented as in FIGS. 1 to 3, and the term "vertical direction" refers to the up-down direction. Of course, when a grinding container 1000 according to an embodiment of the invention is actually in use, the directions mentioned in the specification may not coincide with the actual directions of the parts described.

Figure 3:
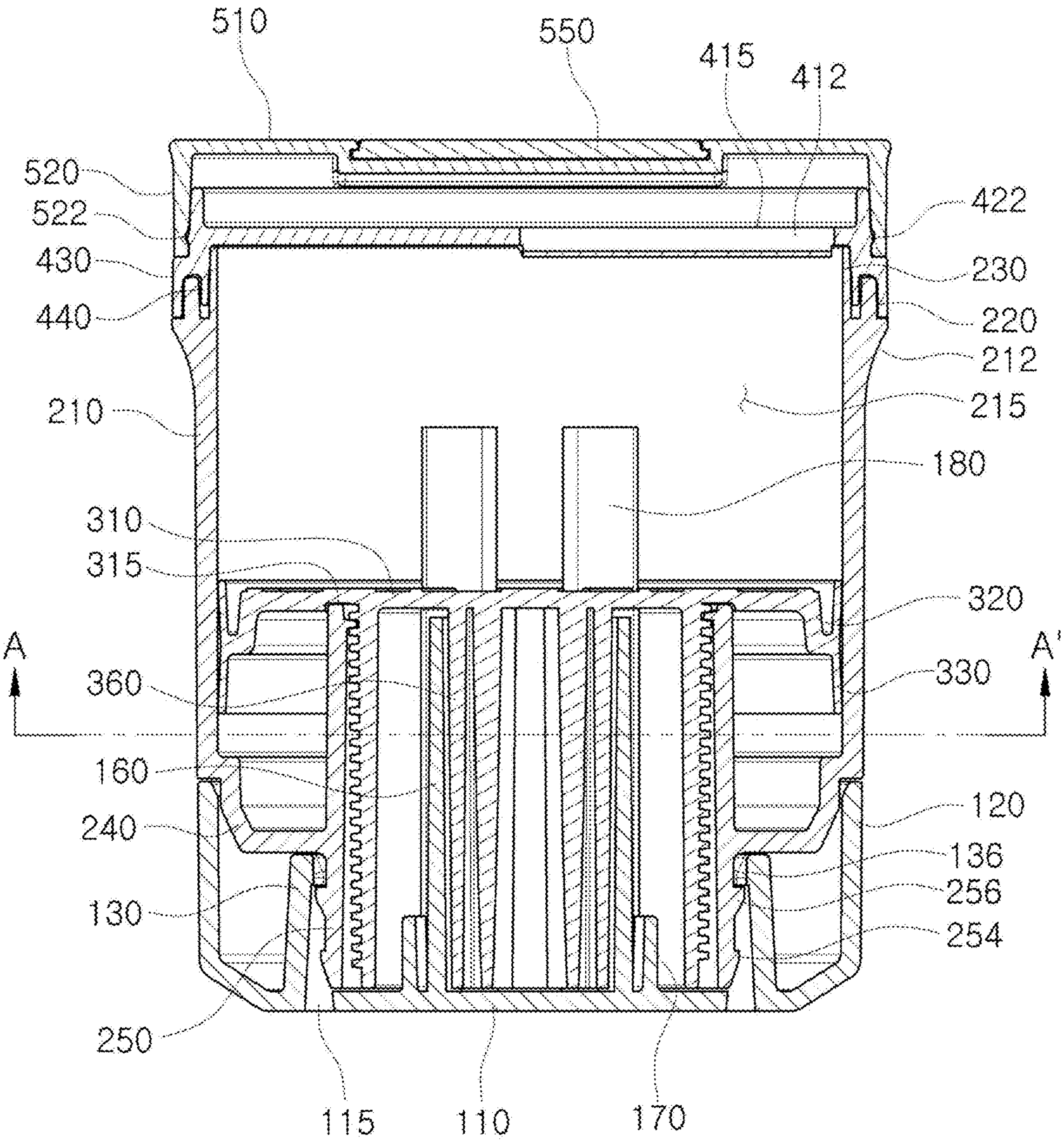
FIG. 3 is a vertical cross-sectional view illustrating the grinding container shown in FIG. 1.
Figure 4:
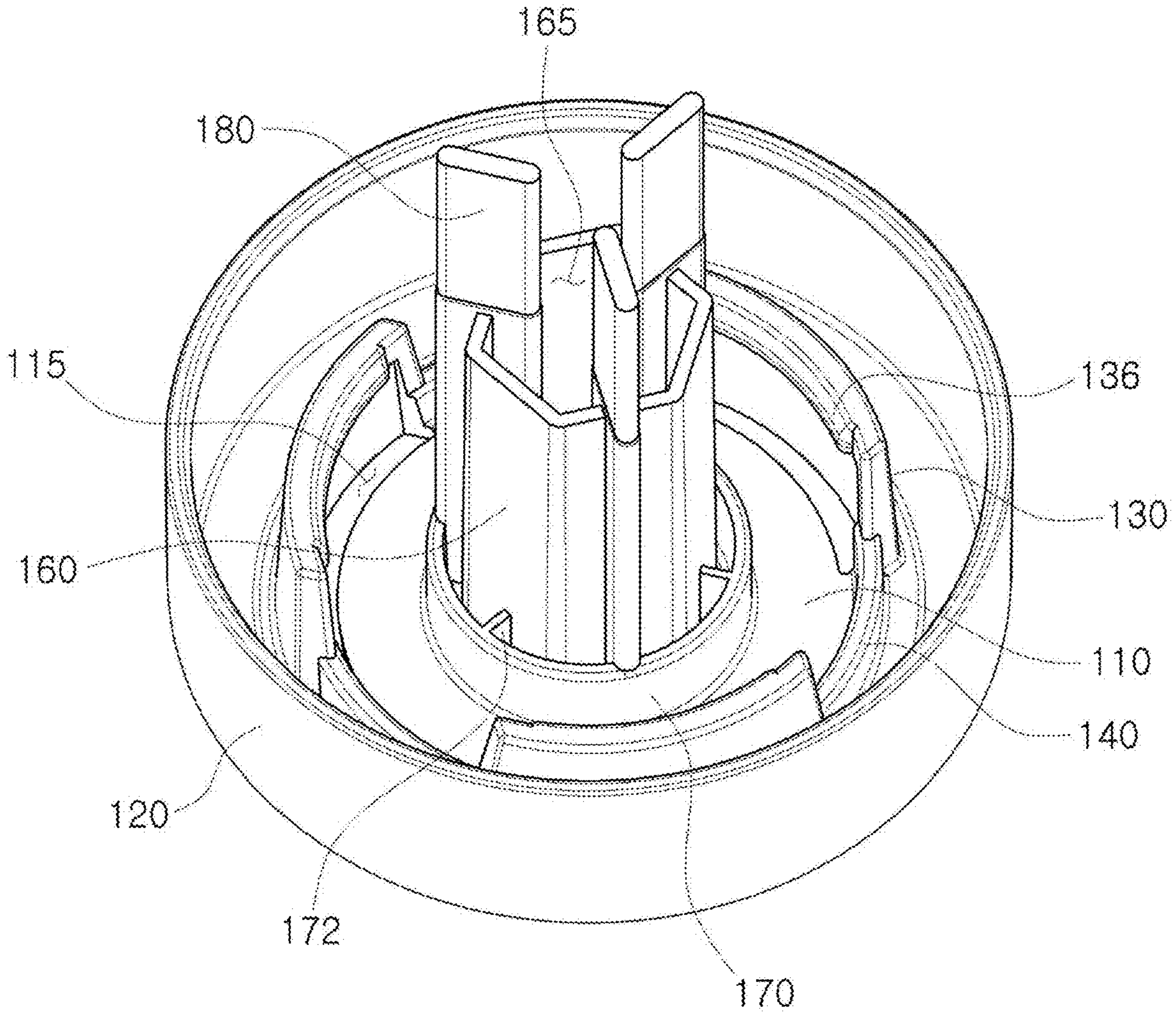
FIG. 4 is a perspective view of the dial of the griding container shown in FIG. 1 as seen from above.
Figure 5:
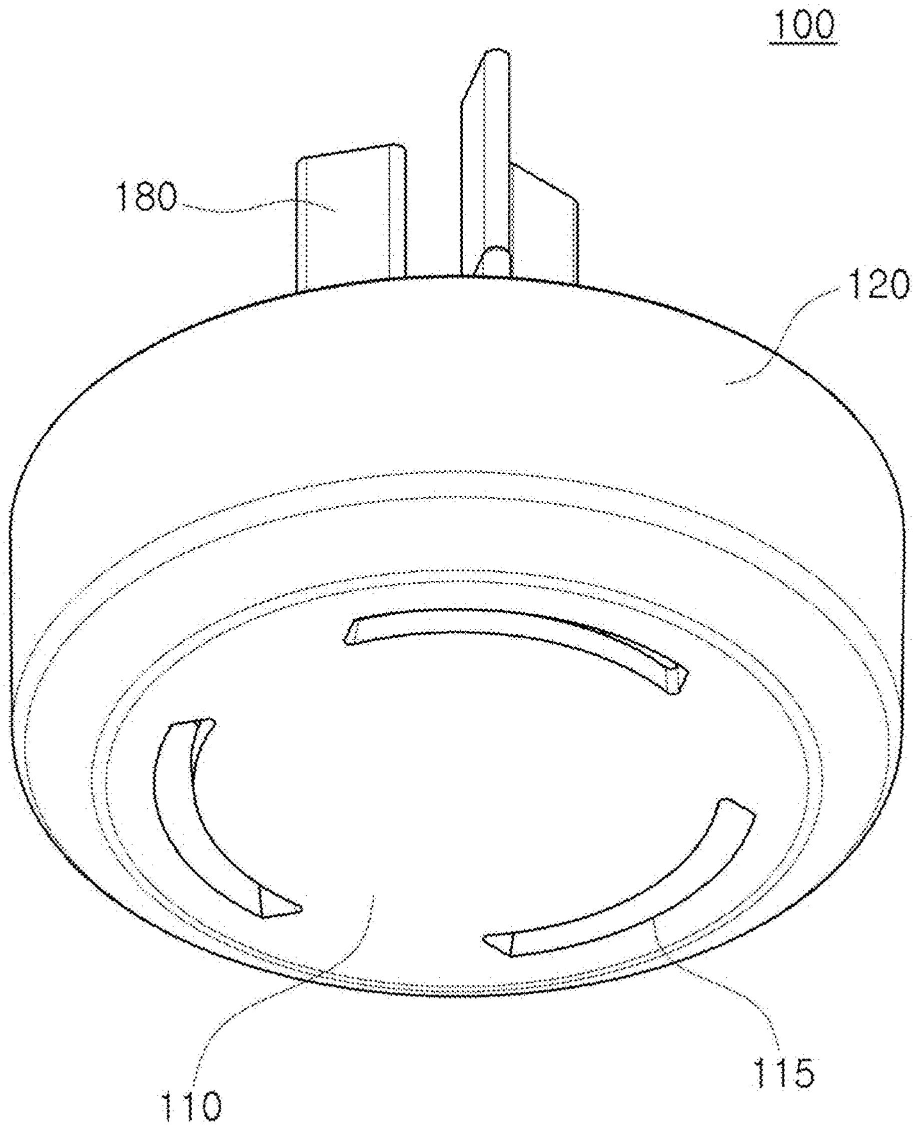
FIG. 5 is a perspective view of the dial of the griding container shown in FIG. 1 as seen from below.
Figure 6:
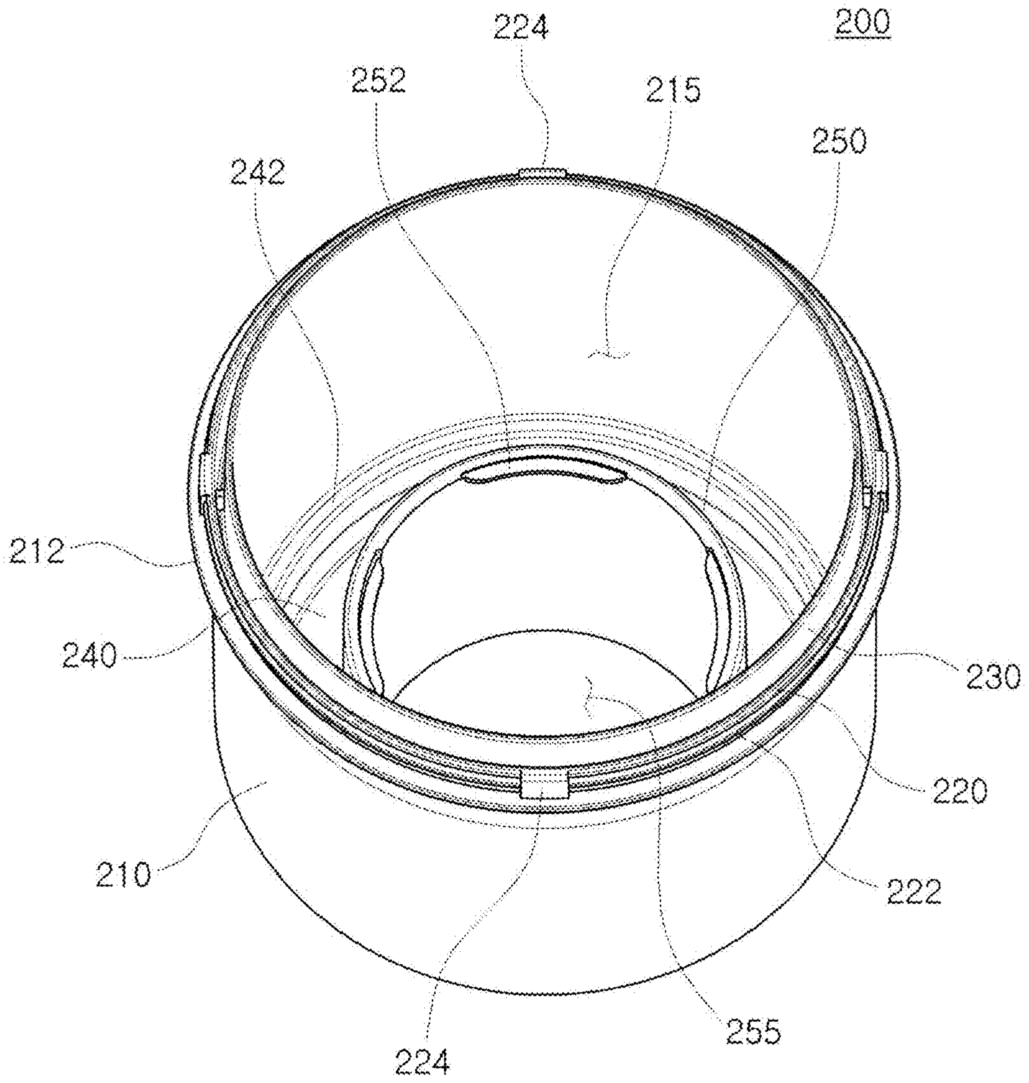
FIG. 6 is a perspective view of the container body of the griding container shown in FIG. 1 as seen from above.
Figure 7:
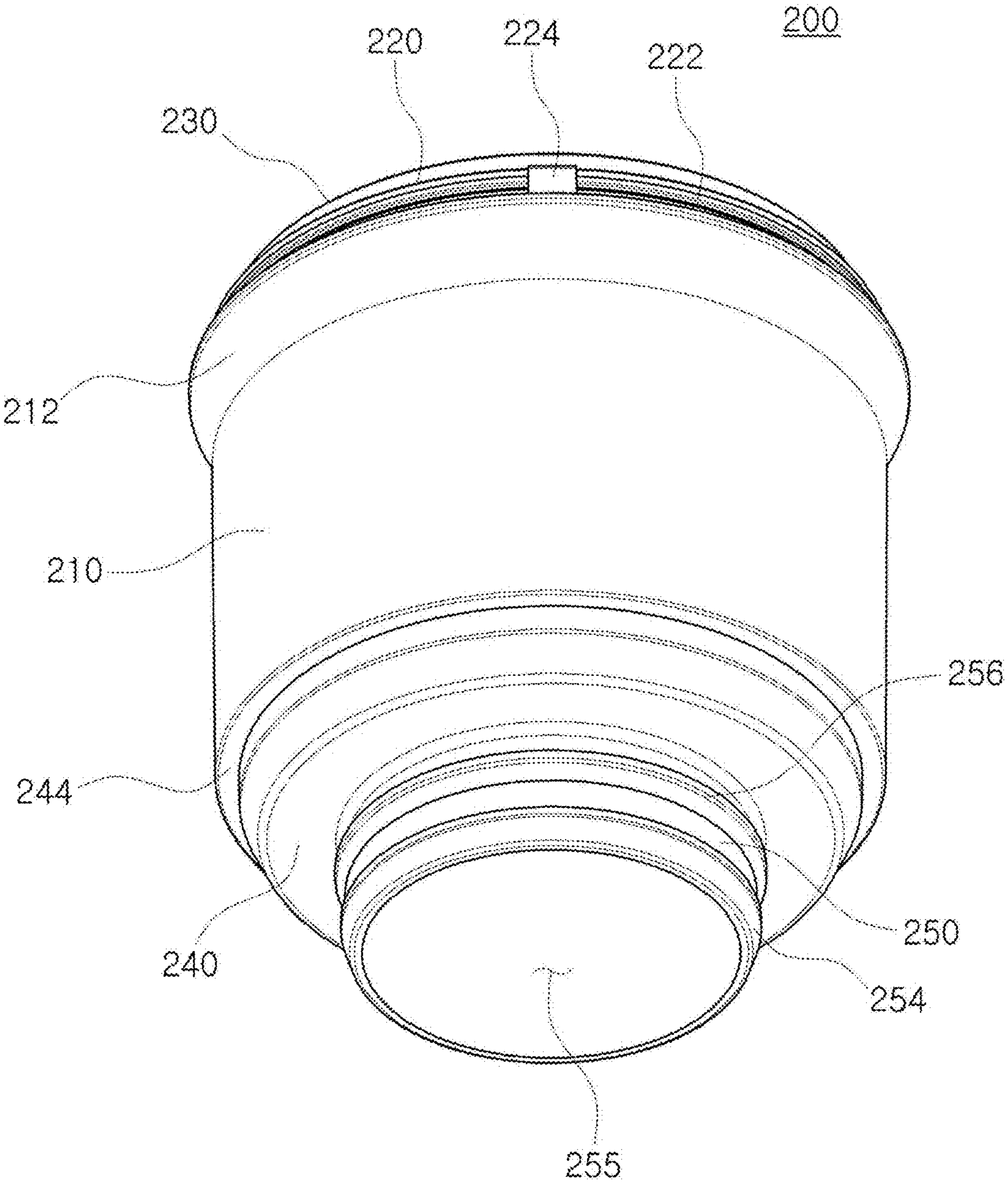
FIG. 7 is a perspective view of the container body of the griding container shown in FIG. 1 as seen from below.
Figure 8:
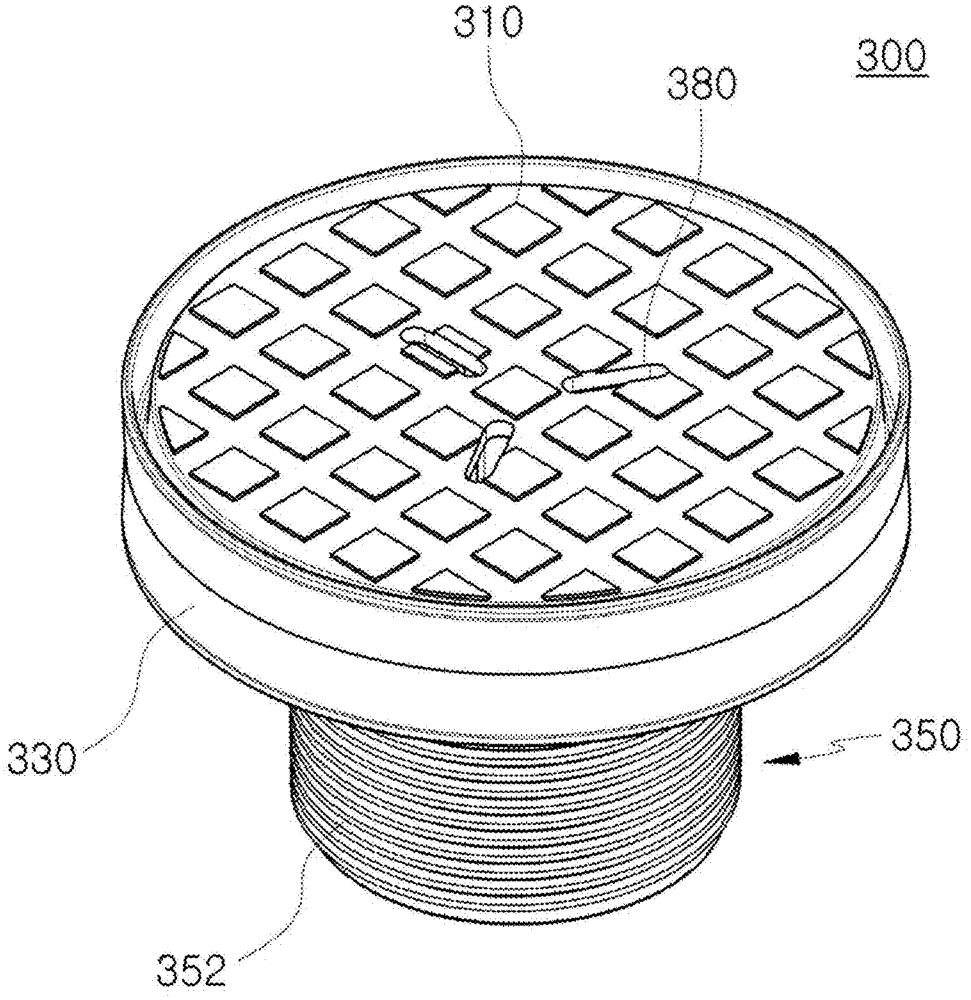
FIG. 8 is a perspective view of the piston of the griding container shown in FIG. 1 as seen from above.
Figure 9:
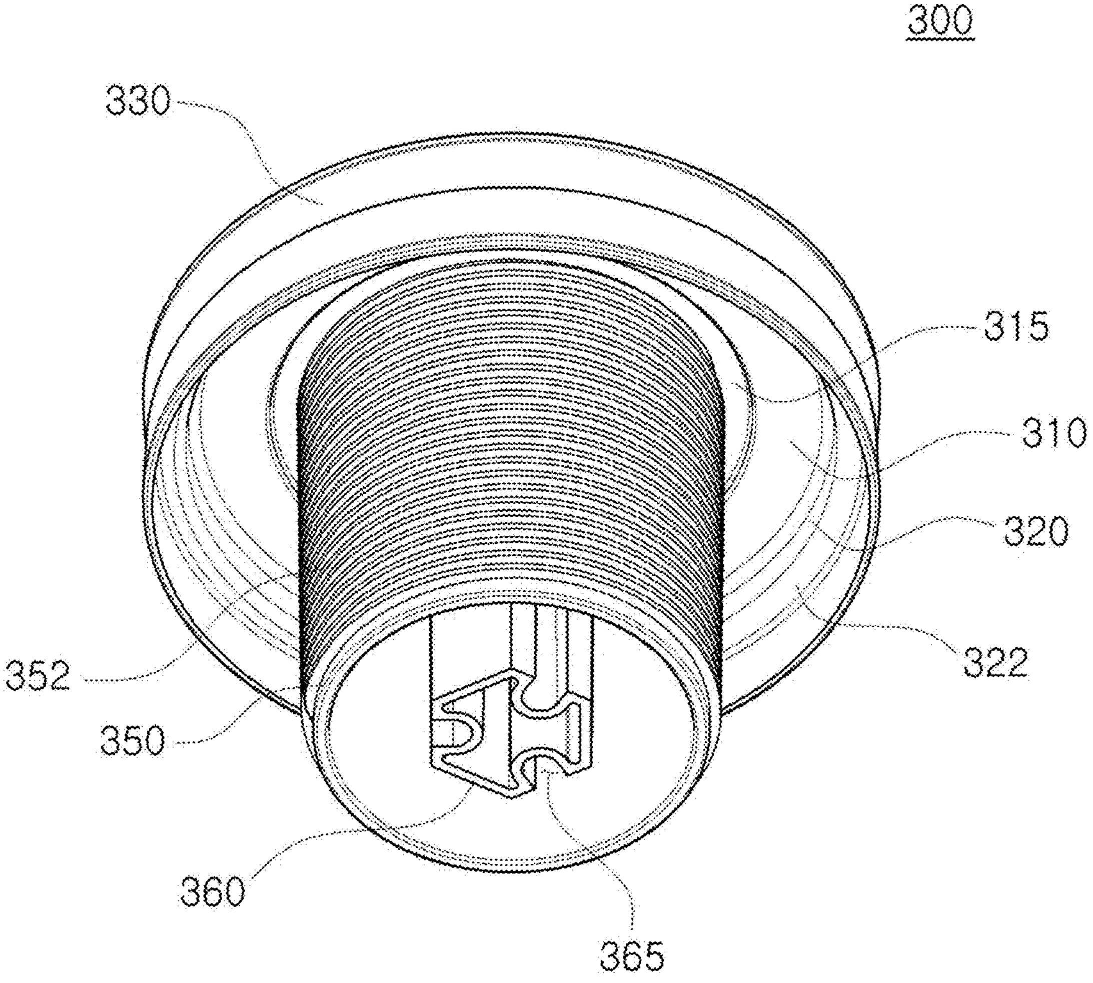
FIG. 9 is a perspective view of the piston of the griding container shown in FIG. 1 as seen from below.
Figure 10:
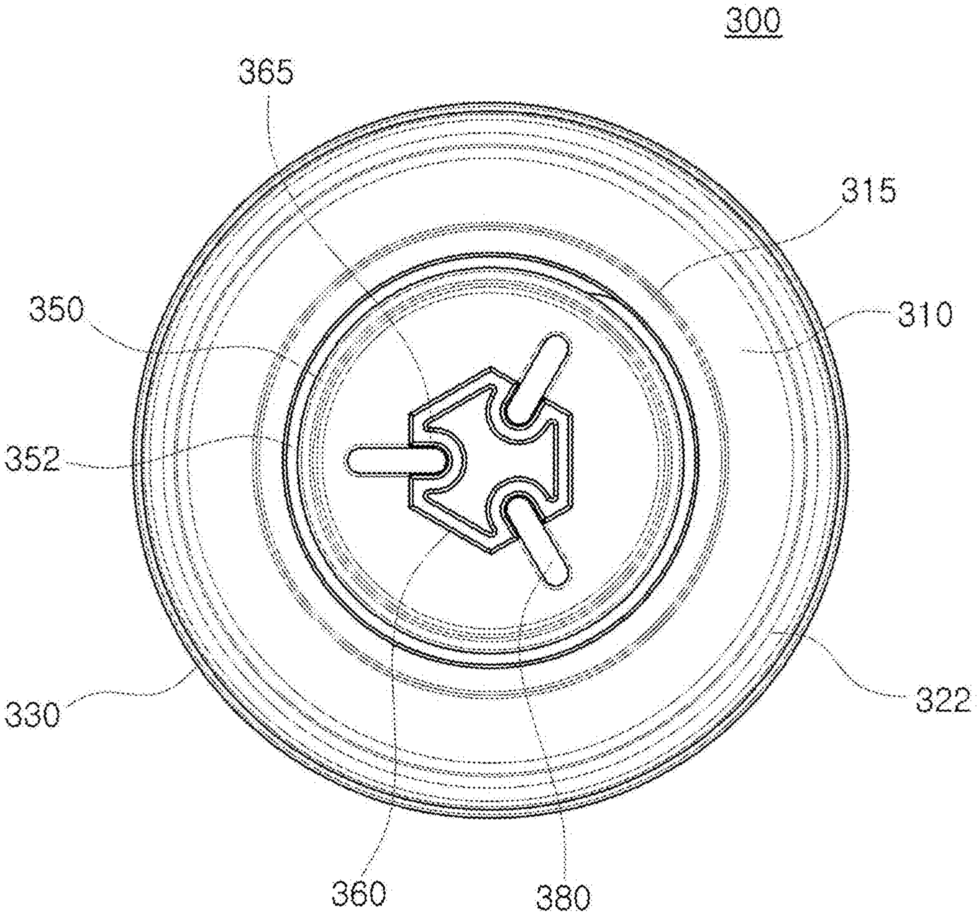
FIG. 10 is a bottom view of the piston of the griding container shown in FIG. 1.
Figure 12:
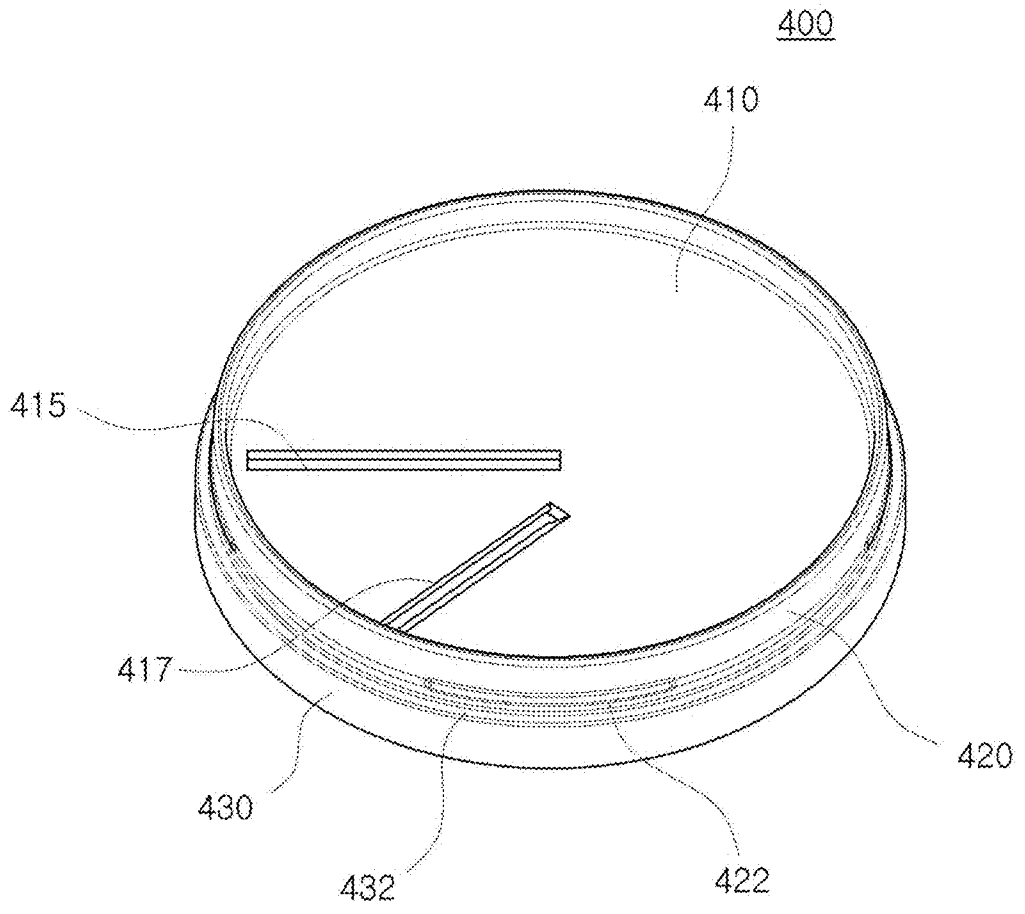
FIG. 12 is a perspective view of the cutter plate of the griding container shown in FIG. 1 as seen from above.
Figure 13:
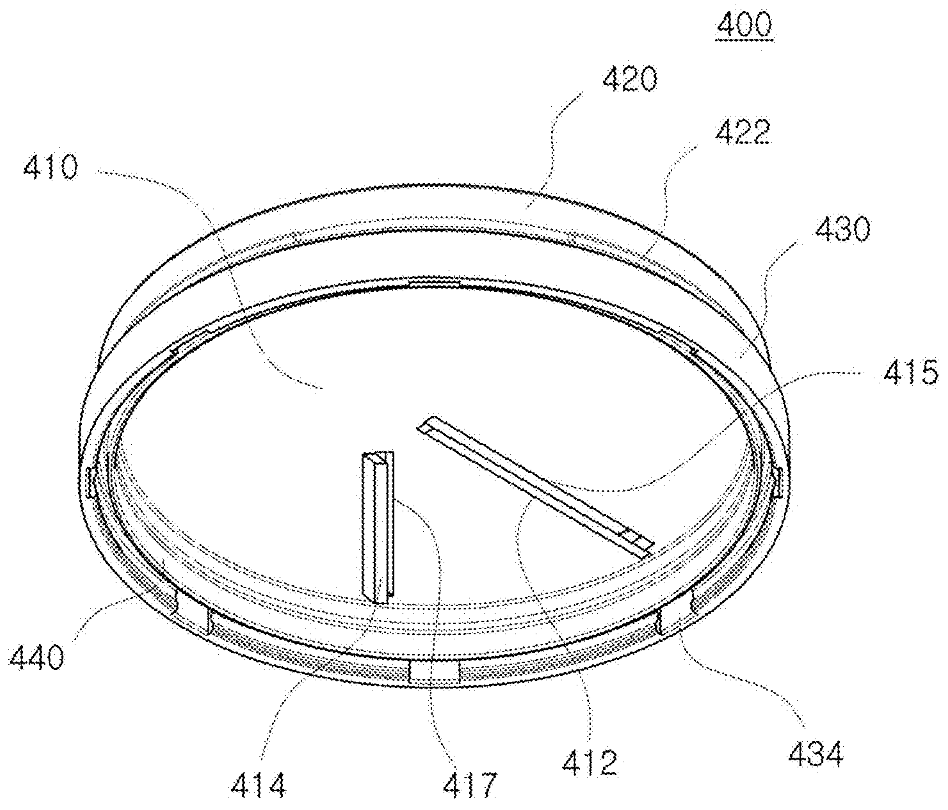
FIG. 13 is a perspective view of the cutter plate of the griding container shown in FIG. 1 as seen from below.
Figure 14:
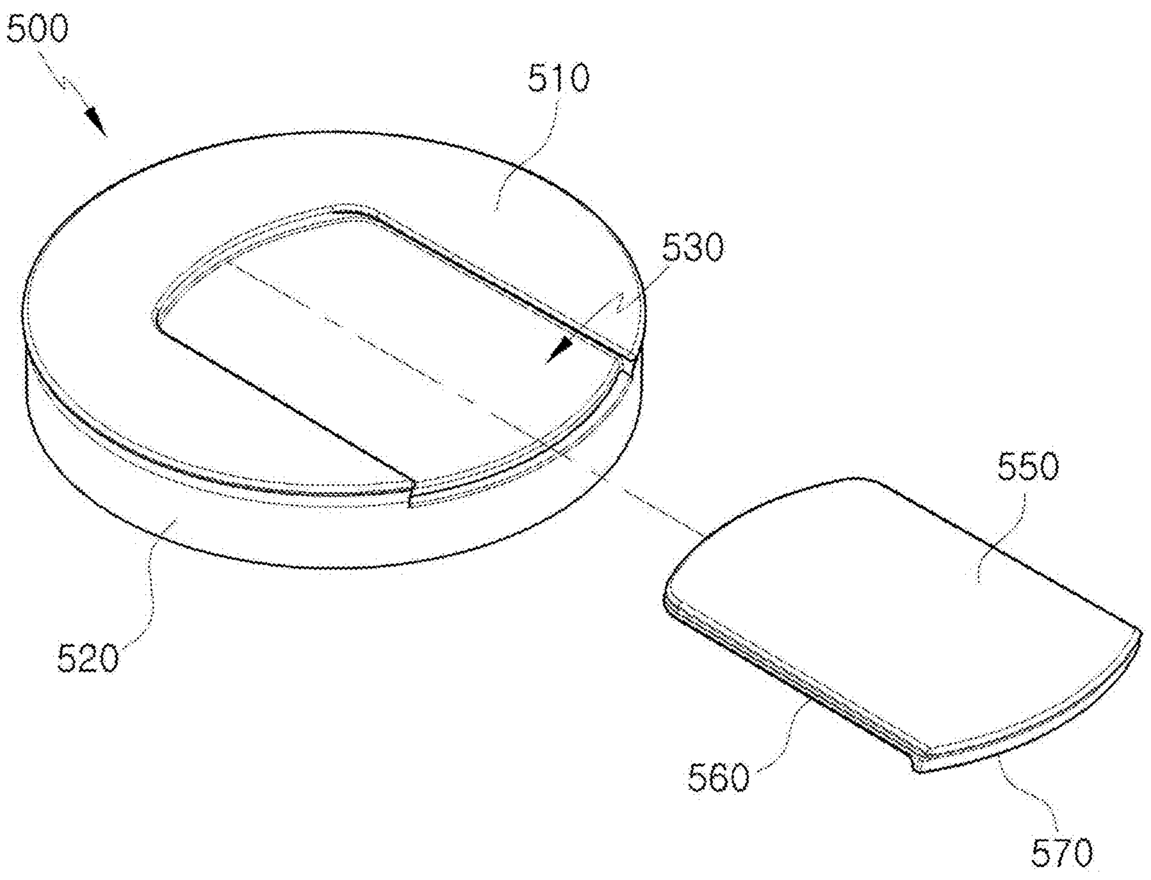
FIG. 14 is a perspective view of the overcap of the griding container shown in FIG. 1.

FIGS. 1 to 3 and 11 illustrate a grinding container 1000 based on an embodiment of the invention. As shown in the drawings, a grinding container 1000 according to an embodiment of the invention can include a dial 100, a container body 200, a piston 300, a cutter plate 400, and an overcap 500. FIG. 4 and FIG. 5 provide a more detailed view of the dial 100, while FIG. 6 and FIG. 7 provide a more detailed view of the container body 200. FIGS. 8 to 10 provide a more detailed view of the piston 300. FIG. 12 and FIG. 13 provide a more detailed view of the cutter plate 400, while FIG. 14 provides a more detailed view of the overcap 500.

The dial 100 corresponds to the part that is gripped and manipulated by the user, when the user wishes to use the grinding container 1000, and for this purpose is rotatably coupled to a lower portion of the container body 200. Referring to FIGS. 1 to 5, the dial 100 can include a base plate 110, a side wall 120, coupling rims 130, reinforcement ribs 140, a first insert coupling part, a reinforcement wall 170, and guide pillars 180.

The base plate 110 can form a lower surface of the dial 100 and to serve as a base on which to arrange other components of the dial 100. In a preferred embodiment of the invention, the base plate 110 can be formed in a size and shape that can hide the lower portion of the socket cylinder 250 of the container body 200. Although the drawings depict the base plate 110 of the dial 100 in a circular shape, and although the dial 100 is a part that is rotated by the user, the base plate 110 does not necessarily have to have a circular shape.

A multiple number of clearance slits 115 can be formed in the base plate 110. Each of the clearance slits 115 can at least partially be formed in the shape of an arc and can be formed on an inner side of the coupling rims 130. In a preferred embodiment of the invention, the clearance slits 115 can each be formed adjacently to one of the coupling rims 130 respectively.

The side wall 120 can extend upward from the edge of the base plate 110. The length in which the side wall 120 extends up can be determined such that, when the dial 100 is coupled to the container body 200, the upper end of the side wall 120 is in contact with or is adjacent to the main shell 210 of the container body 200. The position and size of the side wall 120 can also be determined such that the outer surface of the side wall 120 is flush with the outer surface of the main shell 210. The side wall 120 can be formed along the entire edge of the base plate 110 so as to hide the inner side.

The coupling rims 130 can extend upward from the base plate 110 at positions corresponding to the socket cylinder 250, and a coupling protrusion 136 can be formed on an upper portion of each coupling rim 130. The dial 100 can include a multiple number of coupling rims 130, where each coupling rim 130 can have a cross section shaped as an arc of which the center point is at the center of the base plate 110. Each coupling rim 130 can slope inward towards the top, as illustrated in FIG. 3.

Also, the coupling rim 130 can be longer at the top than at the bottom such that projecting the shape of the coupling rim 130 in a horizontal direction provides a trapezoidal shape. The coupling protrusion 136 can be formed on an upper portion of the coupling rim 130 but preferably may not be formed along the entire upper portion of the coupling rim 130, so that there may be portions on both sides of the upper portion of the coupling rim 130 where the coupling protrusion 136 is not present.

As described above, the clearance slits 115 can be formed adjacently to the coupling rims 130 respectively. For example, as illustrated in FIG. 4, the coupling rims 130 and the clearance slits 115 can all be formed in the shapes of arcs of which the center point is at the center of the base plate 110, and the clearance slits 115 can be formed on the inner sides of the coupling rims 130 in lengths corresponding to the lengths of the coupling rims 130.

The reinforcement ribs 140 can connect the lower portions of adjacent coupling rims 130. That is, the reinforcement ribs 140 can extend up from the base plate 110, and both ends of each reinforcement rib 140 can be connected to the lower portion of a respective coupling rim 130. The reinforcement ribs 140 can also have cross sections shaped as arcs of which the center point is at the center of the base plate 110.

In the example illustrated in FIG. 3, the inner surfaces of the reinforcement ribs 140 have a radius of curvature smaller than that of the inner surfaces of the coupling rims 130, and the outer surfaces of the reinforcement ribs 140 have a radius of curvature that is greater than that of the inner surfaces of the coupling rims 130 but smaller than that of the outer surfaces of the coupling rims 130. Both ends of each reinforcement rib 140 can be formed to overlap the ends of the corresponding coupling rims 130. As described above, at both ends on the upper portion of each coupling rim 130, there may be portions where the coupling protrusion 136 is not formed, and preferably the parts of the coupling rim 130 where the reinforcement ribs 140 overlap may coincide with the parts where the coupling protrusion 136 is not formed.

The dial 100 can include a first insert coupling part, where the first insert coupling part can extend up from the base plate 110. The first insert coupling part may be configured to mate with the second insert coupling part formed on the piston 300. For example, one of the first insert coupling part and the second insert coupling part can include a sleeve, while the other can include a support pillar. In the example illustrated in the drawings, the first insert coupling part formed on the dial 100 is implemented in a form that includes a sleeve 160, while the second insert coupling part formed on the piston 300 is implemented in a form that includes a support pillar 360.

The sleeve 160 can extend up from the base plate 110 and can have a hollow interior to form an insertion space 165 therein. The insertion space 165 can thus be open at the top and can house the support pillar 360 as it is inserted downward from above. The sleeve 160 can be shaped such that the insertion space 165 does not have a circularly shaped cross section. In the example shown in the drawings, the sleeve 160 is formed in the shape of a hollow hexagonal prism.

The reinforcement wall 170 can connect the lower portions of the guide pillars 180 to one another to more firmly secure the guide pillars 180. The reinforcement wall 170 can extend up from the base plate 110 in an annular shape and can be connected to the lower portion on the outer side of each of the guide pillars 180. Connecting parts 172 can also be formed on the reinforcement wall 170, where the connecting parts 172 can be connected to the first insert coupling part (for example, the sleeve 160) so as to more firmly secure the first insert coupling part (for example, the sleeve 160) as well.

The guide pillars 180 can extend upward from positions on the base plate 110 that are not at the center. In a preferred embodiment of the invention, the dial 100 can include a multiple number of guide pillars 180, and each of the guide pillars 180 can have flatly shaped sides. As in the example shown in FIG. 11, the guide pillars 180 can be shaped such that their cross sections extend along imaginary lines that pass through the center of the base plate 110. That is, each guide pillar 180 can be arranged such that the inner side of the guide pillar 180 faces the center of rotation of the dial 100, so that a relatively broader side surface of each guide pillar 180 may face a direction that resists rotation. Such a shape of the guide pillars 180 can help prevent the piston 300 from rotating in relation to the dial 100.

In cases where the first insert coupling part includes the sleeve 160, a part of each guide pillar 180 can be positioned on the inner side of the sleeve 160 and the remaining part of the guide pillar 180 can be positioned on the outer side of the sleeve 160. That is, in a preferred embodiment of the invention, the guide pillars 180 can be implemented in shapes that intersect the sleeve 160, as illustrated in FIG. 4. Such a structure can provide a very firm and stable coupling between the first insert coupling part (i.e., the sleeve 160) and the second insert coupling part (i.e., the support pillar 360).

Referring to FIG. 3 and FIG. 8, the guide pillars 180 can pass through guide slits 380 formed in the holder plate 310 of the piston 300. Since a solidified content (not shown) is arranged on the holder plate 310 of the piston 300, and since the guide pillars 180 extend through the holder plate 310, guide slits can also be formed in the solidified content (not shown) arranged on the holder plate 310, with the guide slits formed in the same sizes and shapes as those of the guide slits 380.

The container body 200, which corresponds to the main part of the grinding container 1000, can form the main body onto which the other components may be coupled and can also house the content (not shown) within. Referring to FIG. 6 and FIG. 7, the container body 200 can include a main shell 210, an outer coupler rim 220, an inner coupler rim 230, a support part 240, and a socket cylinder 250.

The main shell 210 can form the main part of the container body 200 and can have a cylindrical shape overall. The main shell 210 can form a mounting space 215 on its inner side, where the piston 300 and the solidified content (not shown) placed on the piston 300 can be housed within the mounting space 215. As in the example shown in the drawings, the main shell 210 can form a part of the exterior of the grinding container 1000.

In an embodiment of the invention, a ledge 212 can be formed at an upper portion of the main shell 210. The main shell 210 can be increased in outer diameter at the portion where the ledge 212 is formed, to form a step on an upper portion of the ledge 212. Such shape of the ledge 212 can provide space on the upper surface of the ledge 212 for the outer coupler rim 220 and the inner coupler rim 230.

The outer coupler rim 220 and the inner coupler rim 230 can extend upward from the upper surface of the ledge 212 of the main shell 210, where the outer coupler rim 220 can have a greater diameter than that of the inner coupler rim 230 such that a gap may be formed between the outer coupler rim 220 and the inner coupler rim 230. The outer coupler rim 220 and the inner coupler rim 230 cam be used to couple the cutter plate 400 onto the container body 200 and support the cutter plate 400 in a stable manner. For example, the inner coupler rim 440 of the cutter plate 400 can be inserted into the gap between the outer coupler rim 220 and inner coupler rim 230.

One or more coupling protrusions and/or securing protrusions can be formed on at least one of the outer coupler rim 220 and inner coupler rim 230. For example, in the example shown in the drawings, a coupling protrusion 222 is formed on the outer perimeter of the outer coupler rim 220. The coupling protrusion 222 can extend along most of the outer perimeter of the outer coupler rim 220 to form a generally annular shape. When the cutter plate 400 is coupled to the container body 200, the coupling protrusion 222 can be inserted into a coupling groove formed in the outer coupler rim 430 of the cutter plate 400, so that the cutter plate 400 may be prevented from being separated from the container body 200 along the vertical direction.

In the example shown in the drawings, there are also securing protrusions 224 formed on the outer perimeter of the outer coupler rim 220. The securing protrusions 224 can protrude outward from one or more designated positions on the outer perimeter of the outer coupler rim 220. When the cutter plate 400 is coupled to the container body 200, the securing protrusions 224 can be inserted into securing indentations 434 formed in the outer coupler rim 430 of the cutter plate 400, so that the cutter plate 400 may be prevented from being rotated in relation to the container body 200.

The support part 240 can be formed at a lower portion of the main shell 210 and can serve to connect the main shell 210 with the socket cylinder 250 as well as to support the dial 100 that is connected to the container body 200. The support part 240 can have a reduced diameter at the lower portion of the main shell 210 so as to form a downwardly facing step 244 at the lower end of the main shell 210, and a lower surface of the support part 240 can itself also form a step. In order that the side wall 120 of the dial 100 may be easily mounted onto the support part 240, a sloped surface can be formed on the outer side of a lower portion of the support part 240.

The socket cylinder 250 can be connected to the support part 240 and can be formed at a designated position on a lower portion on an inner side of the main shell 210. The socket cylinder 250 can extend a particular distance along the vertical direction and can form a manipulation channel 255 on its inner side. The socket cylinder 250 can be shaped as a cylinder that is open at the top and bottom, so that the manipulation channel 255 may communicate with the mounting space 215 at the top and communicate with the exterior at the bottom. That is, the socket cylinder 250 can be formed such that the manipulation channel 255 provides communication between the mounting space 215 and the exterior.

The manipulation channel 255 of the socket cylinder 250 may provide a passageway through which the dial 100, which is arranged outside the container body 200, and the piston 300, which is arranged inside the container body 200, may interact with each other. In an embodiment of the invention, the socket cylinder 250 itself can participate in the operations of the dial 100 and the piston 300. For example, a thread can be provided on either one of the inner perimeter of the socket cylinder 250 and the outer perimeter of the stem 350 of the piston 300, while a mating protrusion that mates with the thread can be provided on the other. In a preferred embodiment, the diameter of the socket cylinder 250 can be designed to be greater than or equal to ½ of the diameter of the holder plate 310 of the piston 300.

In the example shown in FIG. 6, mating protrusions 252 are formed on the inner perimeter of the socket cylinder 250. The mating protrusions 252 can be formed at positions close to the upper end of the socket cylinder 250 and can have shapes corresponding to a screw so as to be capable of mating with the thread 352 formed on the stem 350 of the piston 300. Of course, the mating protrusions 252 can also be implemented in the form of a thread. That is, in an embodiment of the invention, the mating protrusions 252 can also be implemented in the form of a (female) thread formed along the entire inner perimeter of the socket cylinder 250.

Referring to FIG. 7, an aligning protrusion 254 can be formed on the outer perimeter of the socket cylinder 250, where the aligning protrusion 254 can be formed on a lower portion of the socket cylinder 250. The aligning protrusion 254 can protrude outward along the entire outer perimeter of the socket cylinder 250 in an annular shape, and a lower portion of the aligning protrusion 254 can form a gradual slope or curve. When the dial 100 is coupled to the container body 200, the outer side of the aligning protrusion 254 can contact the reinforcement ribs 140 of the dial 100, so as to help the dial 100 maintain an aligned state with respect to the container body 200 even while being rotated. The slope or curve at the lower portion of the aligning protrusion 254 allows the aligning protrusion 254 to more easily enter the inner side of the reinforcement ribs 140.

A coupling protrusion 256 can also be formed on the outer perimeter of the socket cylinder 250. The coupling protrusion 256 can protrude outward along the entire outer perimeter of the socket cylinder 250 in an annular shape and can be formed at a higher position compared to the aligning protrusion 254, as illustrated in FIG. 7. The lower portion of the coupling protrusion 256 can also form a slope or curve. When the dial 100 is coupled to the container body 200, the coupling protrusion 256 can engage the coupling protrusion 136 formed on the coupling rim 130 of the dial 100. The coupling protrusions 136, 256 of the coupling rim 130 and socket cylinder 250 allow the dial 100 to rotate relative to the container body 200 while preventing the dial 100 from becoming detached from the container body 200 in the vertical direction.

The piston 300 is the part that supports the content (not shown) and is moved along the vertical direction by the manipulation of the user. Referring to FIGS. 8 to 10, the piston 300 can include a holder plate 310, a connecting part 320, a sealing part 330, a stem 350, and a second insert coupling part.

The holder plate 310 is the part that supports the solidified content (not shown) on its upper surface and can generally be shaped as a flat circular plate. The content (not shown) can include a composition for a product such as a cleansing balm, deodorant, etc., and can be supplied on the holder plate 310 in a solid form. In order that the content (not shown) may not easily be separated, one or more recessed portions (i.e., portions recessed downward) and/or protruding portions (i.e., portions protruding upward) can be formed on the holder plate 310.

Guide slits 380 can be formed in the holder plate 310, and guide slits similar to these can also be formed in the content (not shown) provided on the holder plate 310. The guide pillars 180 of the dial 100 extending upward can pass through the guide slits 380 and can also pass through a portion of the content (not shown) placed on the holder plate 310.

An alignment groove 315 can be formed around the stem 350 in the bottom surface of the holder plate 310. The alignment groove 315 can be formed in a position corresponding to the upper end of the socket cylinder 250 of the container body 200, and when the piston 300 is at the lowest position within the mounting space 215, the upper end of the socket cylinder 250 can be inserted in the alignment groove 315.

As depicted in FIG. 3, the connecting part 320 can extend down from the edge of the holder plate 310. The connecting part 320, which connects the sealing part 330 to the holder plate 310, can support the sealing part 330 at a midway height of the sealing part 330 such that the upper end of the sealing part 330 is close to the upper surface of the holder plate 310.

The sealing part 330 can be positioned at the edge of the piston 300 and can be connected by a connecting flange 322 to a lower portion of the connecting part 320. The sealing part 330 can extend up and down and can be formed with a thickness that allows a certain degree of flexibility. With respect to a midway height of the sealing part 330, the outer diameter of the upper portion of the sealing part 330 can increase towards the top, and the outer diameter of the lower portion of the sealing part 330 can increase towards the bottom. This structure allows the sealing part 330 to press against the inner perimeter of the main shell 210 in a relatively watertight fashion, thereby minimizing the amount of content (not shown) leaking below the piston 300.

The stem 350 can extend down from the bottom surface of the holder plate 310. In an embodiment of the invention, the diameter of the stem 350 can be designed to be greater than or equal to ½ of the diameter of the holder plate 310. As described above, in an embodiment of the invention, a thread can be provided on either one of the inner perimeter of the socket cylinder 250 and the outer perimeter of the stem 350, while a mating protrusion that mates with the thread can be provided on the other. In the example illustrated in the drawings, the thread 352 is formed on the outer perimeter of the stem 350 of the piston 300. While the piston 300 is in a coupled state with the container body 200, the mating protrusions 252 of the socket cylinder 250 can be in a mated relationship with the thread 352 of the stem 350. In certain embodiments of the invention, it is also possible to have the mating protrusions formed on the stem 350 and have the thread formed on the socket cylinder 250.

Although the drawings depict the stem 350 of the piston 300 as being inserted into the inner side of the socket cylinder 250, with the thread 352 formed on the outer perimeter of the stem 350 and the mating protrusions 252 formed on the inner perimeter of the socket cylinder 250, certain embodiments of the invention can have the socket cylinder 250 inserted into the inner side of the stem 350, with the thread and mating protrusions formed on the outer perimeter of the socket cylinder 250 and the inner perimeter of the stem 350. Of course, in such cases, the length to which the stem 350 extends downward can be limited by the position of the support part 240.

The second insert coupling part can extend down from the bottom surface of the holder plate 310 and can be engaged and coupled with the first insert coupling part of the dial 100 through the manipulation channel 255 formed in the container body 200. In the example illustrated in the drawings, the first insert coupling part formed on the dial 100 is implemented in a form that includes a sleeve 160, and the second insert coupling part formed on the piston 300 is implemented in a form that includes a support pillar 360.

The sleeve 160 and the support pillar 360 can have cross sections that are not circular, and the support pillar 360 can be shaped such that it is insertable in the insertion space 165 of the sleeve 160. When the support pillar 360 is inserted into the insertion space 165 of the sleeve 160, the outer surface of the support pillar 360 can contact the inner surface of the sleeve 160, and the sleeve 160 may not permit a relative rotation of the support pillar 360, since the support pillar 360 does not have a circular cross section. Of course, various structures can be applied for the first insert coupling part and second insert coupling part by which to prevent the piston 300 from rotating in relation to the dial 100 but permit a movement along the vertical direction.

In embodiments where portions of the guide pillars 180 are positioned on the inner side of the sleeve 160, guide grooves 365 that extend along the vertical direction can be formed in the side surfaces of the support pillar 360. In such cases, the guide grooves 365 can have shapes corresponding to the portions of the guide pillars 180 and, at the upper portion of the support pillar 360, can continue to the guide slits formed in the holder plate 310 of the piston 300. That is, as illustrated in FIG. 10, the guide grooves 365 can coincide with portions of the guide slits 380 when viewed from below the piston 300.

Figure 11:
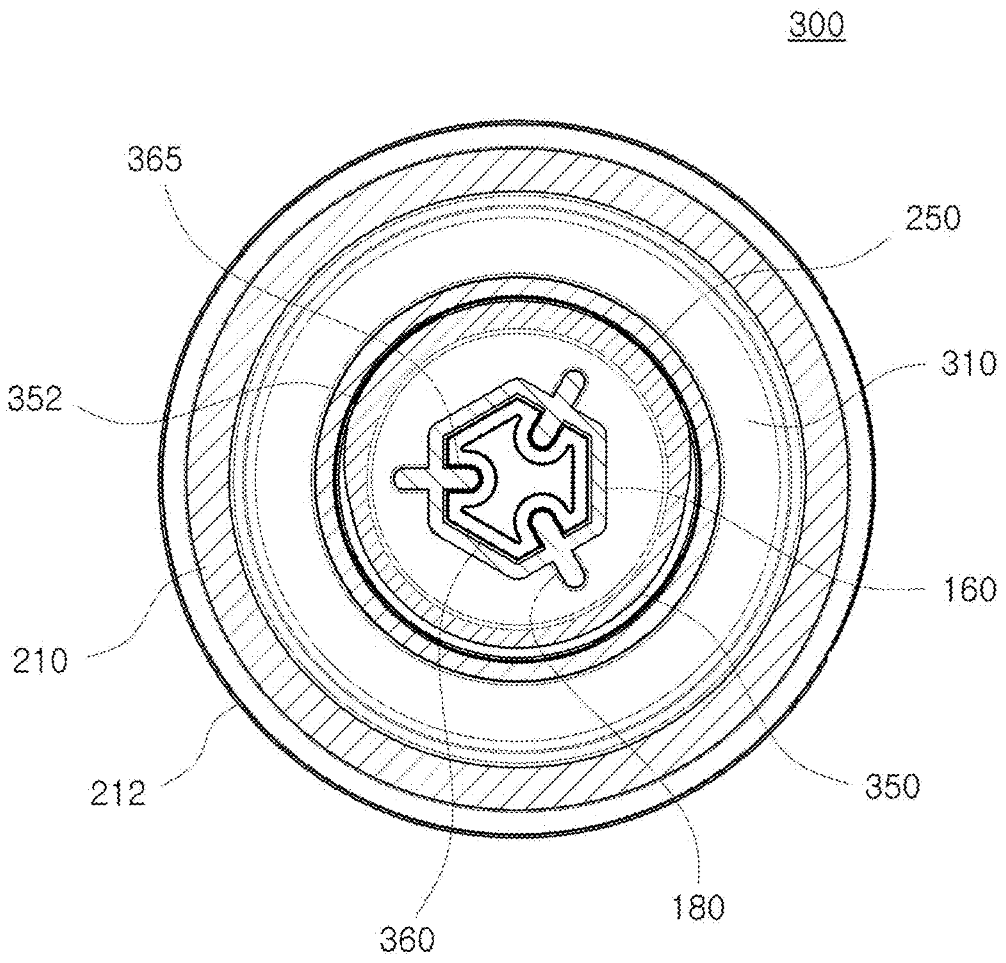
FIG. 11 is a horizontal cross-sectional view of the griding container shown in FIG. 1.

FIG. 11 is a horizontal cross-sectional view of the griding container 1000 across line A-A' of FIG. 3. Referring to FIG. 11, when the piston 300 is in a coupled state with the dial 100, the support pillar 360 may be inserted to the inner side of the sleeve 160, i.e., in the insertion space 165; the guide pillars 180 may be inserted through the guide slits 380 of the holder plate 310; and the inner sides of the guide pillars 180 may be inserted in the guide grooves 365 formed in the side surfaces of the support pillar 360. This structure allows the piston 300 to move in relation to the dial 100 along the vertical direction while effectively preventing the piston 300 from rotating in relation to the dial 100, thereby firmly supporting and aligning the piston 300.

The cutter plate 400 can be positioned at an upper portion of the container body 200 and can serve to cover the mounting space 215 in which the content (not shown) is housed and also to grind the content (not shown) using cutter blades 412, 414 before providing the content to the user. Referring to FIG. 12 and FIG. 13, the cutter plate 400 can include a cover plate 410, a protruding rim 420, an outer coupler rim 430, and an inner coupler rim 440.

The cover plate 410 corresponds to the main part of the cutter plate 400 and can cover the open top of the mounting space 215. Cutter blades 412, 414 for grinding the solidified content (not shown) can be provided on the bottom surface of the cover plate 410, and discharge holes 415, 417 for discharging the ground solid content (not shown) can be formed in the cover plate 410, with the discharge holes 415, 417 penetrating the cover plate 410 along the vertical direction. Although the drawings depict the cover plate 410 as having a circular shape, and although the cutter plate 400 is a part that is rotated relative to the dial 100, the cover plate 410 does not necessarily have to be circular in shape as long as the piston 300 and the content (not shown) are able to rotate relative to the cutter plate 400.

According to an embodiment of the invention, the cutter blades 412, 414 can be provided at positions adjacent to their corresponding discharge holes 415, 417. Thus, when the cutter blades 412, 414 grind a portion of the solidified content (not shown), then the ground content can immediately pass through the adjacent discharge holes 415, 417 to be provided on the upper surface of the cover plate 410.

In the example illustrated in the drawings, the cover plate 410 is provided with a main cutter blade 412 and an auxiliary cutter blade 414. The main cutter blade 412 and the discharge hole 415 adjacent thereto extend inward from the edge of the cover plate 410 in an elongated shape along a first direction and extend to a position that passes the center of the cover plate 410 with respect to the first direction. Here, the center of the cover plate 410 can be regarded as being substantially the same as the center of the cutter plate 400 and may correspond to the center of the rotation relative to the piston 300 and content (not shown). If the cutter blade 412 were to extend only up to a position that does not reach the center of the cover plate 410, then the content (not shown) below the center portion of the cover plate 410 would not be ground, so that the upper surface of the solidified content (not shown) would not maintain a uniform height. This can incur problems such as an inability to grind and provide the content even when the dial 100 is rotated, excessive pressure applied on the cover plate 410 by the unground portion of the content, and others.

The auxiliary cutter blade 414 and the discharge hole 417 adjacent thereto can extend inward from the edge of the cover plate 410 in an elongated shape along a second direction, but it is allowable for these to extend up to a position that does not pass the center of the cover plate 410 with respect to the second direction. The auxiliary cutter blade 414 can grind the content from behind the main cutter blade 412.

In the example illustrated in the drawings, the each of the cutter blades 412, 414 extends along an imaginary line. Of course, it is not necessary for the cutter blades 412, 414 to have linear shapes, and it is possible for the cutter blades 412, 414 to be curved. In cases where the cutter blades 412, 414 extend along imaginary lines, the lines can be arranged so as not to pass the center of the cover plate 410. Such an arrangement allows the multiple cutter blades 412, 414 to extend to positions beyond the center of the cover plate 410.

The protruding rim 420 can protrude up from the edge of the cover plate 410. Since the cover plate 410 is provided with cutter blades 412, 414, the protruding rim 420 can protrude upward so as to prevent surrounding objects from touching the cutter blades 412, 414 too easily. The protruding rim 420 can also be used in the coupling of the overcap 500 to the cutter plate 400, and as such, coupling protrusions 422 can be formed on the outer perimeter of the protruding rim 420.

The outer coupler rim 430 and the inner coupler rim 440 can extend down from a lower portion of the cutter plate 400, where the outer coupler rim 430 can have a larger diameter than that of the inner coupler rim 440, so that a gap may be formed between the outer coupler rim 430 and the inner coupler rim 440. The outer coupler rim 430 and the inner coupler rim 440 can be used to couple the cutter plate 400 to the container body 200 and support the cutter plate 400 in a stable manner. For example, the inner coupler rim 440 of the cutter plate 400 can be inserted into the gap between the outer coupler rim 220 and inner coupler rim 230 of the container body 200, and the outer coupler rim 220 of the container body 200 can be inserted into the gap between the outer coupler rim 430 and the inner coupler rim 440.

One or more coupling grooves and/or securing indentations can be formed in at least one of the outer coupler rim 430 and inner coupler rim 440. For example, a coupling groove can be formed in the inner perimeter of the outer coupler rim 430. When the cutter plate 400 is coupled to the container body 200, the coupling protrusion 222 of the container body 200 can be inserted into the coupling groove formed in the outer coupler rim 430 of the cutter plate 400, thereby preventing the cutter plate 400 from becoming detached from the container body 200 in the vertical direction.

In the example illustrated in the drawings, securing indentations 434 are also formed in the inner perimeter of the outer coupler rim 430. The securing indentations 434 can be formed in one or more designated positions in the inner perimeter of the outer coupler rim 430. When the cutter plate 400 is coupled to the container body 200, the securing protrusions 224 of the container body 200 can be inserted into the securing indentations 434 of the cutter plate 400, thereby preventing the cutter plate 400 from rotating relative to the container body 200. While the descriptions above refer to the coupling protrusions 222 and securing protrusions 224 being formed on the container body 200 and their corresponding coupling groove and securing indentations 434 being formed in the cutter plate 400, the positions of the protrusions and grooves/indentations can obviously be changed.

The cutter plate 400 can thus be coupled to an upper portion of the container body 200 such that the cutter plate 400 is unable to rotate in relation to the container body 200. When using the grinding container 1000, the user can generally hold the dial 100 with one hand, hold the container body 200 with the other hand, and rotate these components in opposite directions. Since the cutter plate 400 is coupled to the container body 200 as a structure that does not allow relative rotation, the cutter plate 400 can be rotated together with the container body 200.

The overcap 500 can be detachably coupled to at least one of the container body 200 and the cutter plate 400 so as to cover the cutter plate 400. Referring to FIGS. 1 to 3 and FIG. 14, the overcap 500 can include a circular plate 510, a side wall 520, a holding recess 530, and a spatula 550.

The circular plate 510, which may be the main part of the overcap 500, can form the upper surface of the overcap 500. The circular plate 510 can be formed in a size and shape that allows it to completely cover the cover plate 410.

The side wall 520 can extend down from the edge of the circular plate 510. Coupling indentations 522 can be formed in the inner perimeter of the side wall 520, and when the overcap 500 is coupled to the cutter plate 400, the coupling protrusions 422 of the cutter plate 400 can be inserted in the coupling indentations 522 in a manner that allows a detachable coupling of the overcap 500.

The holding recess 530 is a recess formed in the upper surface of the circular plate 510 and corresponds to a part in which the spatula 550 may be held. The holding recess 530 can be open at the top and at the front. On both sides of the holding recess 530 the upper portion of the circular plate 510 can protrude inward.

The spatula 550 can have a generally flat shape and is a tool that can be used by the user to apply the content on a target area. On both sides of the spatula 550, outwardly protruding detent portions 560 can be formed on the lower portions of the spatula 550, and at the front of the spatula 550, a downwardly protruding stopper 570 can be formed on the lower portion of the spatula 550.

When the spatula 550 is retracted into the holding recess 530, the detent portions 560 of the spatula 550 may be caught on both sides of the holding recess 530, so that the spatula 550 may be prevented from becoming detached in the vertical direction. The spatula 550 can be configured such that, when the spatula 550 is retracted up to the very rear, the stopper 570 at the front touches the side wall 520 of the overcap 500.

The following provides a more detailed description, with reference to FIGS. 1 to 14, of a process for assembling a grinding container 1000 according to an embodiment of the invention.

After each component of the grinding container 1000 is fabricated, the piston 300 can be inserted into the mounting space 215 through the open top of the container body 200. The holder plate 310 of the piston 300 may remain in the mounting space 215 above the socket cylinder 250, and the stem 350 of the piston 300 can be inserted in the manipulation channel 255 through the open top of the socket cylinder 250. Here, if the piston 300 is rotated while the mating protrusions 252 of the socket cylinder 250 are in a mating relationship with the thread 352 of the stem 350, the mating protrusions 252 may move along the thread 352, causing the piston 300 to move down.

The dial 100 can be coupled to a lower portion of the container body 200, where the dial 100 can be coupled after the piston 300 has been moved down to the very end or before the piston 300 has moved down completely. When the dial 100 is coupled, the guide pillars 180 of the dial 100 can be pushed up while inserted within the guide grooves 365 formed in the support pillar 360 of the piston 300 or while inserted in both the guide grooves 365 of the support pillar 360 and the guide slits 380 of the holder plate 310. When the dial 100 is pushed upward, the lower portion of the coupling protrusion 256 formed on the outer perimeter of the socket cylinder 250 may contact the upper portion of the coupling protrusion 136 formed on the inner perimeter of the coupling rim 130 of the dial 100.

As the dial 100 is pushed up further, the coupling rims 130 may retreat outward, allowing the coupling protrusion 256 of the socket cylinder 250 to move beyond the coupling protrusions 136 of the coupling rims 130, as a result of which the coupling protrusions 136, 256 may engage each other. Since a slope or curve is formed on the upper portion of each coupling protrusion 136, and since a slope or curve is formed also on the lower portion of the coupling protrusion 256, the coupling protrusion 256 of the socket cylinder 250 can move past the coupling protrusions 136 of the coupling rims 130 without difficulty. Here, the clearance slits 115 formed on the inner side of the coupling rims 130 also allow the coupling rims 130 to retreat outward without difficulty.

When the dial 100 is properly coupled, the side wall 120 of the dial 100 may contact the step 244 at the bottom of the main shell 210 and the outer perimeter of the support part 240, the aligning protrusion 254 formed on the outer perimeter of the socket cylinder 250 may contact the reinforcement ribs 140 of the dial 100, and the upper ends of the coupling rims 130 of the dial 100 may contact the lower surface of the support part 240. Such a structure can help the dial 100 to maintain an aligned state with respect to the container body 200. Also, when the dial 100 is properly coupled, the coupling protrusions 136 of the coupling rims 130 can engage the coupling protrusion 256 of the socket cylinder 250, so that the dial 100 is prevented from becoming separated along the vertical direction but permitted to undergo rotations relative to the container body 200.

When the piston 300 of the grinding container 1000 is at the lowest possible position within the mounting space 215 as in FIG. 3, the lower end of the stem 350 of the piston 300 can contact the base plate 110 of the dial 100, and the upper end of the socket cylinder 250 of the container body 200 can be positioned in the alignment groove 315 formed in the bottom surface of the holder plate 310.

The guide pillars 180 of the dial 100 can pass through the guide slits 380 of the holder plate 310 and extend to a particular position within the mounting space 215. Although it is not shown in the drawings, a solidified content (not shown) may be provided on the holder plate 310, and the guide pillars 180 can extend within the content (not shown). During the manufacture of the grinding container 1000, the solidified content (not shown) can be prepared separately and afterwards inserted into the mounting space 215 or can be supplied in a liquid form, etc., over the holder plate 310 and afterwards solidified in the corresponding position.

After the content (not shown) is supplied in the mounting space 215, the cutter plate 400 can be coupled to an upper portion of the container body 200. With the securing indentations 434 of the cutter plate 400 aligned with the securing protrusions 224 of the container body 200, the cutter plate 400 can be pushed down such that the inner coupler rim 440 of the cutter plate 400 is inserted into the gap between the outer coupler rim 220 and the inner coupler rim 230 and the outer coupler rim 220 of the container body 200 is inserted into the gap between the outer coupler rim 430 and the inner coupler rim 440. As the coupling protrusion 222 formed on the container body 200 is inserted into the coupling groove formed in the cutter plate 400, the cutter plate 400 can be secured to the container body 200, and the securing protrusions 224 inserted in the securing indentations 434 can secure the cutter plate 400 such that the cutter plate 400 is unable to rotate in relation to the container body 200.

With the dial 100, container body 200, piston 300, and cutter plate 400 assembled thus, the overcap 500 holding the spatula 550 can be coupled to an upper portion of the assembly. The spatula 550 can be pushed back from the front of the overcap 500 to be inserted into the holding recess 530.

The following provides a more detailed description, with reference to FIGS. 1 to 14, of a process for using a grinding container 1000 according to an embodiment of the invention.

When a user wishes to use the grinding container 1000, the user may first separate the overcap 500, so that the cutter plate 400 may be exposed. The user may grip the container body 200 with one hand and grip the dial 100 with the other hand. When the user rotates the dial 100, the engagement between the first insert coupling part and the second insert coupling part may transmit the rotational force applied on the dial 100 to the piston 300, so that both the piston 300 and the dial 100 may rotate together in relation to the container body 200.

Since the piston 300 and the container body 200 form a screw joint by way of the thread 352 and the mating protrusions 252, the rotating of the piston 300 relative to the container body 200 causes the mating protrusions 252 to move along the thread 352, and as a result, the holder plate 310 of the piston 300 may gradually move upward within the mounting space 215.

As the holder plate 310 moves up, the content (not shown) supplied on the upper surface of the holder plate 310 may move up together and may come into contact with the bottom surface of the cover plate 410. Whereas the cutter plate 400 is secured to the container body 200 and unable to rotate in relation to the container body 200, the piston 300 is secured to the dial 100 and unable to rotate in relation to the dial 100. Since the container body 200 and the dial 100 are rotated relatively to each other, the cover plate 410 as viewed from the perspective of the piston 300 is rotated in relation to the holder plate 310 by the same force applied by the user for rotating the dial 100. The cutter blades 412, 414 of the cover plate 410, which is rotated in relation to the holder plate 310 in this manner, can scrape and grind the upper surface of the solidified content (not shown), and the ground content can be lifted by the cutter blades 412, 414 to be provided through the discharge holes 415, 417 and onto the upper surface of the cover plate 410. The user can apply the ground content to a target area, for example by using the spatula 550 provided on the overcap 500.

When the user rotates the dial 100, the sealing part 330 of the piston 300 flexibly contacts the main shell 210 of the container body 200, and if an excessive amount of stress were to occur, the connecting part 320 and connecting flange 322 between the holder plate 310 and the sealing part 330 can absorb some of the stress.

The diameters of the stem 350 of the piston 300 and the socket cylinder 250 of the container body 200 can be greater than or equal to ½ of the diameter of the holder plate 310 of the piston 300, so that even if the solidified content (not shown) placed on the holder plate 310 has a considerable weight, the piston 300 can maintain a stably aligned state. The structure including the support pillar 360 and guide grooves 365 as well as the sleeve 160 and guide pillars 180 can provide a very firm coupling between the piston 300 and the dial 100 and moreover can help the stem 350 of the piston 300 and the socket cylinder 250 of the container body 200 maintain a stably aligned state. The coupling rims 130 and reinforcement ribs 140 of the dial 100 help the dial 100 to maintain an aligned state with respect to the socket cylinder 250 of the container body 200.

The clearance slits 115 formed on the inner side of the coupling rims 130 in the dial 100 allow the dial 100 not to have an excessively rigid structure and thus can prevent the occurrence of excessive stress being focused on any one portion of the dial 100 and socket cylinder 250 when the user rotates the dial 100. Also, the sealing part 330 provided at the edge of the piston 300 is formed in a thickness that renders it flexible and is connected to the holder plate 310 by the connecting part 320 and connecting flange 322, and this structure can also prevent any wear and damage due to excessive stress between the holder plate 310 and the main shell 210.

As the user continues using the grinding container 1000, the amount of solidified content on the piston 300 would decrease, and the piston 300 would be positioned at gradually increased heights. As the height of the piston 300 increases, the proportion of overlap between the first and second insert coupling parts of the dial 100 and piston 300 would decrease, and as a result, the strength with which the first insert coupling part (for example, the sleeve 160) of the dial 100 secures the second insert coupling part (for example, the support pillar 360) may also decrease. However, since the guide pillars 180 extend into the mounting space 215, and since the guide pillars 180 remain inserted in the guide grooves 365 even when the holder plate 310 of the piston 300 is moved to a position higher than the upper ends of the guide pillars 180, the piston 300 and the content (not shown) placed thereon can still be kept in an aligned state by the guide pillars 180. In particular, the fact that the piston 300 has reached an increased height would mean that the weight of the content (not shown) has decreased, and therefore the piston 300 and content (not shown) can be sufficiently supported with only the guide pillars 180.

While the foregoing provides a description with reference to an embodiment of the present invention, it should be appreciated that a person having ordinary skill in the relevant field of art would be able to make various modifications and alterations to the present invention without departing from the spirit and scope of the present invention set forth in the scope of claims below.

What is claimed is:

1. A grinding container comprising:

a container body comprising a main shell and a socket cylinder, the main shell forming a mounting space on an inner side thereof, the mounting space having an open top, the socket cylinder positioned at a lower portion on an inner side of the main shell and extending a particular length along a vertical direction, the socket cylinder forming a manipulation channel on an inner side thereof, the manipulation channel providing communication between the mounting space and an exterior;

a piston having at least a portion thereof arranged within the mounting space to support a solidified content, the piston having a guide slit formed in an upper surface thereof and configured to move along a vertical direction in relation to the container body, the guide slit penetrating the upper surface of the piston along a vertical direction;

a dial rotatably coupled to a lower portion of the container body and comprising a guide pillar extending up to the mounting space, the guide pillar inserted in the guide slit through the manipulation channel such that an upper end of the guide pillar is positioned within the mounting space; and a cutter plate coupled to an upper portion of the container body to cover a top of the mounting space, the cutter plate comprising a cutter blade formed on a bottom surface thereof for grinding the solidified content, the cutter plate having a discharge hole formed therein for discharging the ground solidified content, the discharge hole penetrating the cutter plate along a vertical direction.

2. The grinding container of claim 1, wherein the piston comprises a stem, the stem extending down such that at least a portion of the stem is positioned within the manipulation channel, a thread is provided on either one of an inner perimeter of the socket cylinder and an outer perimeter of the stem, and a mating protrusion is formed on an other of the inner perimeter of the socket cylinder and the outer perimeter of the stem, the mating protrusion configured to mate with the thread.

3. The grinding container of claim 1, wherein the dial comprises a first insert coupling part extending upward, the piston comprises a second insert coupling part extending downward, either one of the first insert coupling part and the second insert coupling part comprises a sleeve, the sleeve forming an insertion space on an inner side thereof, an other of the first insert coupling part and the second insert coupling part comprises a support pillar, the support pillar inserted into the insertion space of the sleeve, and the support sleeve has a non-circular cross section so as to prevent the piston from rotating in relation to the dial but permit the piston to move along a vertical direction in relation to the dial.

4. The grinding container of claim 3, wherein the first insert coupling part comprises the sleeve, the second insert coupling part comprises the support pillar, a portion of the guide pillar is positioned on an inner side of the sleeve, and a guide groove is formed in a side surface of the support pillar, the guide groove configured to receive the guide pillar inserted therein.

5. The grinding container of claim 1, wherein the dial includes a plurality of guide pillars and comprises a reinforcing wall, the reinforcing wall extending up from a lower surface of the dial and connecting a lower portion of each of the plurality of guide pillars.

6. The grinding container of claim 1, wherein the socket cylinder has a lower portion thereof extending below the main shell, and the dial comprises a coupling rim, the coupling rim rotatably coupled to the lower portion of the socket cylinder.

7. The grinding container of claim 6, wherein a clearance slit is formed in the dial on an inner side of the coupling rim.

8. The grinding container of claim 1, wherein the cutter blade extends in an elongated form from an edge of the cutter plate inward along a first direction up to a position passing beyond a center of the cutter plate with respect to the first direction.

9. The grinding container of claim 1, wherein the cutter blade extends along an imaginary line on the cutter plate, and the imaginary line does not pass through a center of the cutter plate.

10. The grinding container of claim 1, further comprising:

an overcap detachably coupled to at least one of the container body and the cutter plate.

11. The grinding container of claim 10, wherein the overcap comprises a detachably coupled spatula.

* * * * *